Oct. 2, 1934.  M. M. BORDEN  1,975,711
REVERSE FLOW METER
Filed Jan. 13, 1932  2 Sheets-Sheet 1
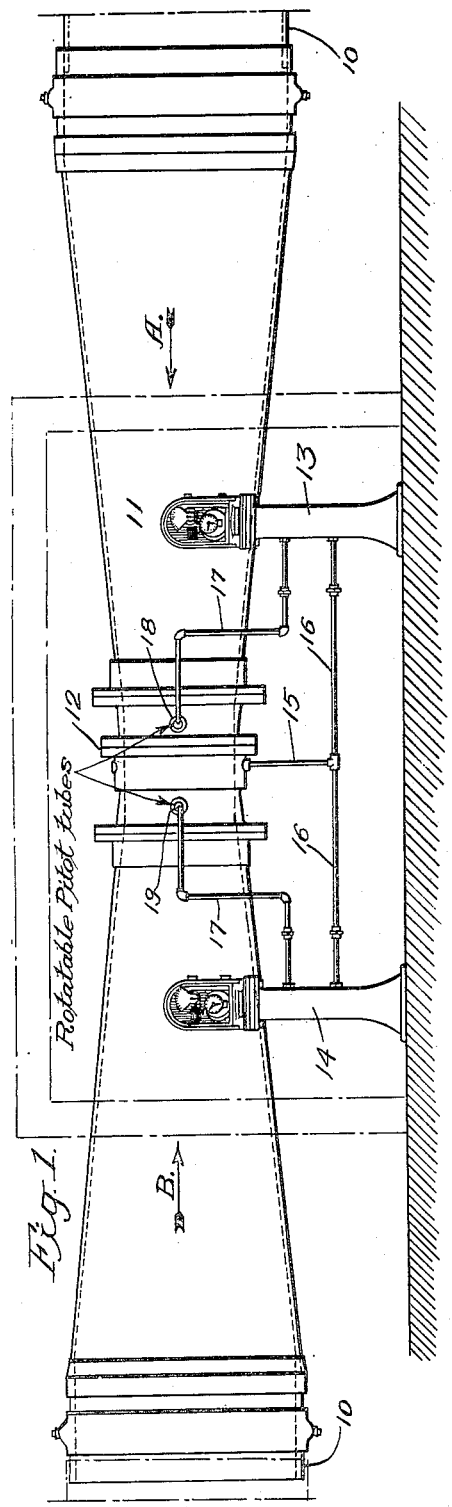
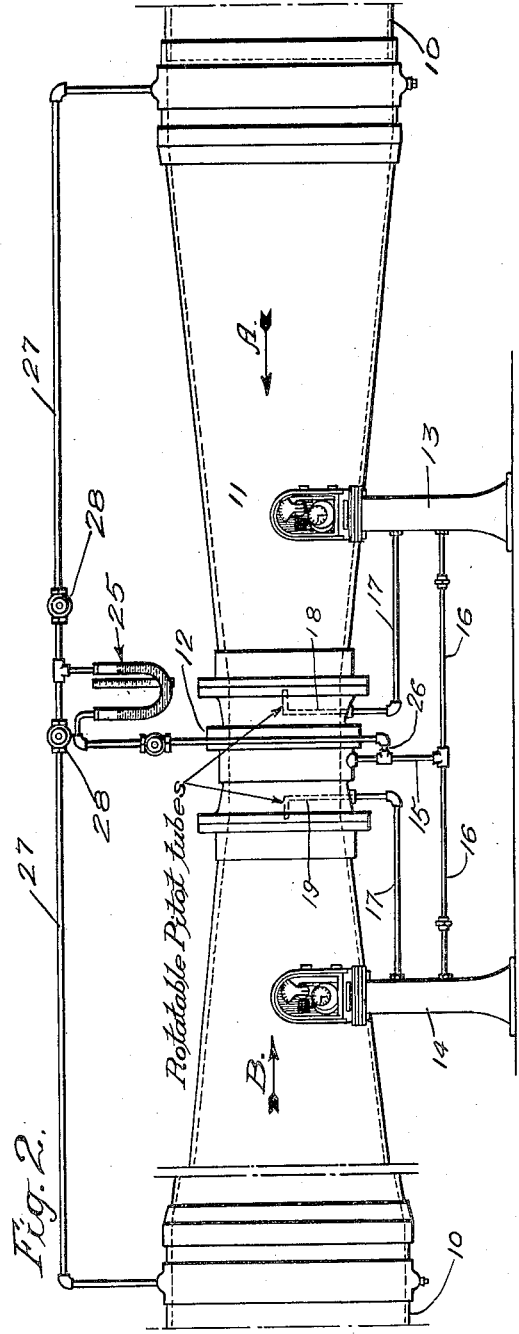
Inventor:—
Moro M. Borden
by his Attorneys
Howson & Howson

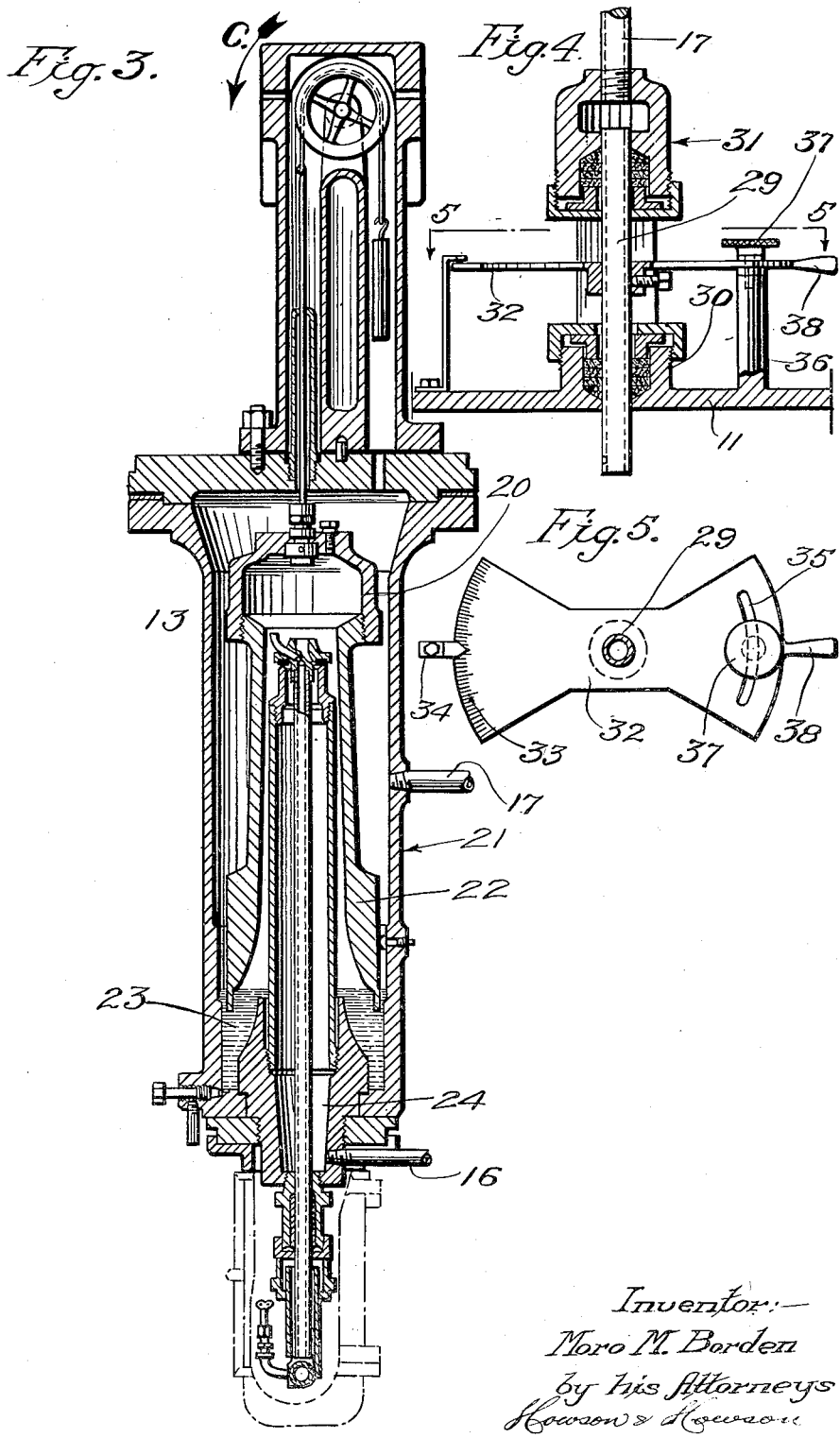

Patented Oct. 2, 1934

1,975,711

UNITED STATES PATENT OFFICE 1,975,711

REVERSE FLOW METER

Moro M. Borden, Philadelphia, Pa., assignor to Simplex Valve and Meter Company, Philadelphia, Pa., a corporation of Delaware Application January 13, 1932, Serial No. 586,429

6 Claims. (Cl. 73—167)

This invention relates to reverse flow meters and has for a particular object thereof the provision of an extremely cheap and efficient and readily regulatable metering apparatus for metering and totalizing flow in opposite directions in the same main.

A further and more specific object of the invention is the provision of reverse flow metering apparatus obtaining pressure differentials for operation of meters by the use of a pressure connection to a main which is proportionate to main pressures without regard to the direction of flow and Pitot tubes arranged in the main and oppositely faced therein so that during flow in either direction one of the tubes will be subject to impact and the other to suction as a result of such flow, thereby establishing during flow in either direction a pressure differential permitting operation of a meter of the Ledoux type.

A further object of the invention is the provision in apparatus of this character of an arrangement such that the impact pressures which the Pitot tubes transmit may be readily regulated so that meter operating pressures of desired intensity may be provided.

These and other objects I attain by the construction shown in the accompanying drawings wherein, for the purpose of illustration, I have shown a preferred embodiment of my invention and wherein:

Fig. 1 is a side elevation of metering apparatus constructed in accordance with my invention;

Fig. 2 is a view similar to that of Fig. 1, partially diagrammatic in its nature and illustrating the use of the calibrating instrument with the meters;

Fig. 3 is a detail sectional view showing a type of meter operating mechanism suitable for use in connection with apparatus of this character.

Fig. 4 is a detail sectional view illustrating one method of mounting the Pitot tubes; and Fig. 5 is a section on line 5—5 of Fig. 4.

Referring now more particularly to the drawings, the numeral 10 indicates a main having arranged therein a venturi 11 the throat of which is indicated at 12; 13 and 14 designate pressure-differential-operated meters, preferably of the Ledoux type, common connections of which are connected to the throat of the venturi by a conduit 15 having branches 16 leading to the meters, the remaining connections of which are connected through conduits 17 with Pitot tubes 18 and 19 the orifice ends of which are disposed within the venturi and preferably within the throat of the venturi at opposite sides of, and in close proximity to the throat connection 15 so that these orifice ends are subject to an increased velocity flow resulting from the use of the venturi. Pitot tubes 18 and 19 face in opposite directions in the venturi; that is to say, the Pitot tube 18 faces flow in the main in the direction of the arrow "A", while the Pitot tube 19 faces flow in the main in the direction of the arrow "B".

As is well known to those familiar with the art, the Ledoux type meter is controlled through a float 20 which is disposed within a pressure chamber 21 and has a long skirt 22 the lower end of which is immersed in a bath of mercury 23. Projecting upwardly from the bottom of this chamber into the interior of the float above the level of the mercury is a conduit 24 with which, in accordance with my invention, the conduits 16 are placed in communication. The conduits 17 are placed in communication with the chamber 21 above the level of the mercury and exteriorly to the float 20. It will be obvious that with flow in the direction of the arrow "A", Pitot tube 18 will be subjected to impact and will, accordingly, have an increased pressure over the pressure derived from the connections 15 and 16 so that in meter 13 the pressure within the chamber will tend to drive the mercury around the lower end of the skirt 22 so that it rises inside the skirt thereby decreasing the effective immersion of the float so that the float lowers causing rotation of the pointer in a direction indicated by the arrow "C" of Fig. 3, providing a meter indication and operation. On the other hand, Pitot tube 19, since it faces in the same direction as the flow, produces a reduced pressure in the chamber 21 with respect to the pressure produced in the interior of the float of meter 14 by the connections 15 and 16 with the result that the above operation is reversed in this meter; the rotation is in the opposite direction to the arrow "C" of Fig. 3 and the meter pointer is firmly set at zero, rendering the meter inoperative.

In Fig. 2 I have illustrated semi-diagrammatically the complete reverse flow metering unit. As shown in this figure, in addition to the venturi, the meters, and the connections between this venturi and the meters, this metering unit preferably likewise includes a manometer 25 having one of its pressure inlets connected to the Venturi throat preferably by a tap 26 from conduit 15 and the other of its pressure inlets connected by conduits 27 each having a valve 28 therein to opposite ends of the venturi. The manometer tube, operating as it does under a well known law, may be employed to set and check the meters 13 and 14.

It is found that in installations of this character the pressure differentials exceed those provided by the usual manometer connections and therefore require special meters. In order that this may be avoided, I provide means for rotating the Pitot tubes so that the pressure differentials delivered may be the pressures used in operation of a standard meter, this structure being shown in Figs. 4 and 5. In these figures 29 designates the shank of the Pitot tube rotatably directed through the wall of the venturi at a stuffing box 30 and having swivel connection with the pipe 17 at 31. Secured to the shank 29 is a plate 32 having a segmental index 33 for coaction with a fixed pointer 34 and having a slot 35 overlying a fixed post 36 and adapted for passage of a securing element 37 to hold the plate 32 in adjusted positions. A handle 38 may be provided to shift the plate if so desired. It will be obvious that when the Pitot tube is so disposed that its mouth faces longitudinally of the conduit the flow will exercise the greatest effect thereon, this effect diminishing as the mouth approaches a position transverse to the conduit. Therefore, by adjustment of the pitots the pressure differential in the pipes 16 and 17 may be brought within the range of a suitable and readily available meter.

While I have referred above to the use of a venturi in the flow conduit, it will, of course, be understood that it is readily possible to employ the meter arrangement without any velocity increasing means or with other types of such means.

I am aware that it has been proposed heretofore to meter reverse flows by use of a single apparatus including two metering elements and flow shifted mechanical devices for transferring the recording mechanism from one to the other of these metering elements. The present apparatus, however, accomplishes the same result without the use of flow shifted parts and, accordingly, provides a much simpler mechanism and one which will have greater efficiency throughout a long period of service.

Since the arrangement of the elements hereinbefore set forth is capable of a considerable range of change and modification without in any manner departing from the spirit of my invention, I do not wish to be understood as limiting myself thereto except as hereinafter claimed.

I claim:

1. In reverse flow metering apparatus, a venturi, two meters operated by pressure differentials, a static pressure connection between similar terminals of the meters and the venturi, a pair of oppositely facing Pitot tubes arranged in the venturi and disposed at corresponding points at opposite sides of the throat thereof, a connection between the Pitot tubes and the remaining terminals of the meters whereby each Pitot tube in combination with the static pressure connection to the venturi provides pressure differentials for operation of one of said meters, and means rotatably mounting said Pitot tubes whereby the position of the mouths of the tubes may be varied to vary the differential pressures delivered to said meters.

2. In reverse flow metering apparatus, a flow line, a static pressure connection with the flow line, oppositely facing Pitot tubes disposed in the flow line and a pair of meters each having a single float and each having one terminal thereof connected to the static pressure connection and the other terminal thereof connected to one of said Pitot tubes.

3. In reverse flow metering apparatus, a flow line, a static pressure connection with the flow line, oppositely facing Pitot tubes disposed in the flow line, a pair of meters each having one terminal thereof connected to the static pressure connection and the other terminal thereof connected to one of said Pitot tubes, means mounting said Pitot tubes for rotation and means for securing the Pitot tubes in adjusted positions.

4. In reverse flow metering apparatus, a flow line having a contracted section, a static pressure connection with the flow line at said contracted section, oppositely facing Pitot tubes disposed in the flow line and a pair of meters each having one terminal thereof connected to the static pressure connection and the other terminal thereof connected to one of said Pitot tubes.

5. In metering apparatus, a flow line, a static pressure connection with the flow line, oppositely facing Pitot tubes disposed in the flow line, means mounting said Pitot tubes for rotation, means for securing the Pitot tubes in adjusted positions and metering mechanism operatively connected to said static pressure connection and said Pitot tubes.

6. In reverse flow metering apparatus, a flow line having a venturi disposed therein, a static pressure connection in the flow line at the Venturi throat, oppositely facing Pitot tubes disposed in the venturi at opposite sides of the throat and a pair of meters each having one terminal thereof connected to the static pressure connection and the other terminal thereof connected to one of said Pitot tubes.

MORO M. BORDEN.